United States Patent
Bresciani et al.

(10) Patent No.: US 8,625,108 B2
(45) Date of Patent: Jan. 7, 2014

(54) PROTECTIVE OPTICAL METROLOGY SYSTEM FOR DETERMINING ATTITUDE AND POSITION

(75) Inventors: Fulvio Bresciani, Rome (IT); Fabio Musso, Rome (IT)

(73) Assignee: Thales Alenia Space Italia S.p.A. Con Unico Socio, Rome (IT)

( * ) Notice: Subject to any disclaimer, the term of this patent is extended or adjusted under 35 U.S.C. 154(b) by 0 days.

(21) Appl. No.: 13/440,734

(22) Filed: Apr. 5, 2012

(65) Prior Publication Data

US 2012/0257194 A1    Oct. 11, 2012

(30) Foreign Application Priority Data

Apr. 8, 2011  (IT) .............................. TO2011A0325

(51) Int. Cl.
*G01B 11/14*  (2006.01)

(52) U.S. Cl.
USPC ......................................... 356/614; 356/622

(58) Field of Classification Search
USPC ................... 356/614–624, 388–398, 3–3.16, 356/4.01–4.1, 5.01–5.15, 6–22; 359/373, 359/372, 368, 362; 250/550, 200
See application file for complete search history.

(56) References Cited

U.S. PATENT DOCUMENTS

| 4,834,531 | A | 5/1989 | Ward |
| 2005/0213096 | A1* | 9/2005 | Kouris et al. ................. 356/388 |
| 2008/0111985 | A1 | 5/2008 | Bridges |
| 2011/0043808 | A1 | 2/2011 | Isozaki et al. |
| 2012/0261513 | A1* | 10/2012 | Bresciani et al. .......... 244/158.4 |

FOREIGN PATENT DOCUMENTS

FR      2702056      9/1994

OTHER PUBLICATIONS

Italian Search Report dated Nov. 21, 2011.

* cited by examiner

*Primary Examiner* — Tri T Ton
(74) *Attorney, Agent, or Firm* — McCarter & English, LLP

(57) ABSTRACT

Described herein is a projective optical metrology system including: a light target equipped with a plurality of light sources having a pre-set spatial arrangement; an optoelectronic image sensor; an optical unit receiving a light signal coming from the light target and defining two different optical paths for the light signal towards the optoelectronic image sensor, the two optical paths being such as to cause simultaneous formation on the optoelectronic image sensor of at least two images of the light target; and an electronic processing unit coupled to the optoelectronic image sensor and determining a plurality of different quantities indicating the position and attitude of the light target with respect to the optical unit, on the basis of the two images.

20 Claims, 7 Drawing Sheets

PROTECTIVE OPTICAL METROLOGY SYSTEM FOR DETERMINING ATTITUDE AND POSITION

The present invention relates to an optical metrology system of a projective type. In particular, the present invention regards a projective optical metrology system for determining attitude and position.

BACKGROUND OF THE INVENTION

As is known, now available are numerous metrology systems, which find use, amongst other things, in the aerospace sector. In particular, in the aerospace sector, metrology systems are known having the function of determining the attitude and/or position of a satellite. Even more in particular, metrology systems are known which enable, given a pair of satellites, determination of the mutual position and mutual attitude of the two satellites.

Determination of the attitudes and positions of satellites is of particular importance in the case of satellite systems the satellites of which are arranged in formation, i.e., in the cases where there is envisaged the determination of the attitude and position of each satellite as a function of the attitude and position of the other satellites.

In practice, given two satellites, determination of the mutual attitude and mutual position requires determination of six degrees of freedom. In fact, assuming a first reference system and a second reference system fixed with respect to a first satellite and a second satellite, respectively, and formed, each, by a triad of perpendicular axes, the mutual attitude and mutual position of the first and second reference systems, and hence of the first and second satellites, can be expressed in terms of three (linear) displacements and three rotations (angles). In particular, the mutual position of the first satellite with respect to the second satellite can be expressed by means of a set of three displacements measured, respectively, along the three axes of the second reference system. Likewise, the mutual attitude of the first satellite with respect to the second satellite can be expressed by means of a set of three angles, equal to corresponding rotations of the first reference system with respect to the second reference system.

This being said, in general optical metrology systems now available can be divided into so-called "coarse" systems and so-called "fine" systems, according to the accuracy and the field of application, the latter being given by the range of distances that can lie between the satellites without the levels of performance degrading significantly.

In greater detail, fine metrology systems enable determination of the mutual position of two satellites with an accuracy lower than a centimeter, provided that the satellites are not set at a distance apart greater than about fifty meters. Some fine metrology systems even enable determination of the mutual position of two satellites with an accuracy of the order of one tenth of a millimeter, provided that the satellites are not set at a distance apart greater than one meter.

Instead, coarse metrology systems are characterized by an accuracy not lower than about ten centimeters. However, they are able to operate also when the distance between the satellites is greater than fifty meters, for example also up to distances of twenty kilometers.

By way of example, coarse metrology systems comprise metrology systems based upon the use of the satellite global positioning system (GPS), as well as metrology systems based upon the use of radio-frequency radiation, the latter resorting to considerably complex antenna networks.

As regards, instead, fine metrology systems, known to the art are systems of an at least in part projective type, which envisage that, given two satellites, one of them is equipped with a target formed by a number N of light sources, and the other is equipped with an optical unit, which includes an optoelectronic sensor able to acquire an image of the target, on the basis of which, by means of post-processing, the optical unit itself determines one or more of the aforementioned degrees of freedom.

By way of example, the patent application No. BP1986018 describes a system for determining the position and attitude of a system with six degrees of freedom, and where the number N of light sources of the target is equal to one. However, to enable determination of all six degrees of freedom, the system described in the document No. EP1986018 requires the individual light source to be formed by a coherent-light source such as, for example, a laser, and moreover requires that the optical unit will be able to carry out, in addition to processing of the images of the target, measurements of the power effectively received by the optoelectronic sensor and an angular measurement of rotation of the polarization of the beam of light emitted by the coherent-light source.

In even greater detail, with reference to a first satellite and a second satellite, and assuming that the target is located on the first satellite, the system described in the document No. EP1986018 envisages that the optical unit on board the second satellite will be equipped with three optoelectronic detectors that are able to process images and detect, each, the power associated to the fraction of electromagnetic radiation emitted by the coherent-light source and effectively impinging upon the optoelectronic detector itself. Consequently, the system described in the document No. EP1986018 is not of a purely projective type.

There are on the other hand known also fine metrology systems that do not envisage determination of measurements of power, i.e., metrology systems of a purely projective type. With respect to what is described in the document No. EP1986018, said systems of a projective type require the use of targets formed by a large number of light sources. An example of said metrology systems is provided in the document No. U.S. Pat. No. 7,561,262, where the light sources are formed by reflectors designed to be arranged on the first satellite, which are illuminated by radiation emitted by the second satellite. Moreover known are fine metrology systems of a purely projective type, where the target is formed by a particularly large number of light sources (for example, eight).

The use of targets formed by a large number of light sources involves a greater complexity of construction, and moreover entails an increase in the consumption of electric power both in the case where the light sources are optically active (i.e., they emit light signals) and in the case where they are passive (i.e., they are formed, for example, by reflectors). In fact, in the latter case it is necessary to irradiate the satellite housing the target with a particularly wide electromagnetic-wave front in order to illuminate all the reflectors, with consequent expenditure of electromagnetic power.

Moreover known are so-called "star-tracking" systems. For example, the document No. US2005/213096 describes a system designed to receive light signals coming from a stellar field and to generate a pair of images using an array of mirrors that can be actuated independently of one another. The mirrors are arranged in such a way that, given a stellar target that is to be identified, when this stellar target is framed by the system, the corresponding pair of images collapses into a common focal point, enabling recognition of the stellar target itself. This system hence operates on the hypothesis of light rays coming from infinity, and hence parallel to one another; moreover, it does not enable determination of any quantity regarding the position (distance) of the stars with respect to the system itself.

Finally, systems of the type described in the document No. US2008/111985 are known, where a first image and a second image of a target are formed on two different photosensitive arrays. Quantities of interest are then determined on the basis alternatively of the first image or else of the second image. This system is hence characterized by a certain complexity since it requires the use of two different photosensitive arrays.

SUMMARY OF THE INVENTION

The aim of the present invention is to provide a projective optical metrology system that will solve at least in part the drawbacks of the known art.

According to the invention, a projective optical metrology system is provided as defined in claim 1.

BRIEF DESCRIPTION OF THE DRAWINGS

For a better understanding of the invention, embodiments thereof are now described, purely by way of non-limiting example and with reference to the attached drawings, wherein.

DETAILED DESCRIPTION OF THE INVENTION

Figure 1:
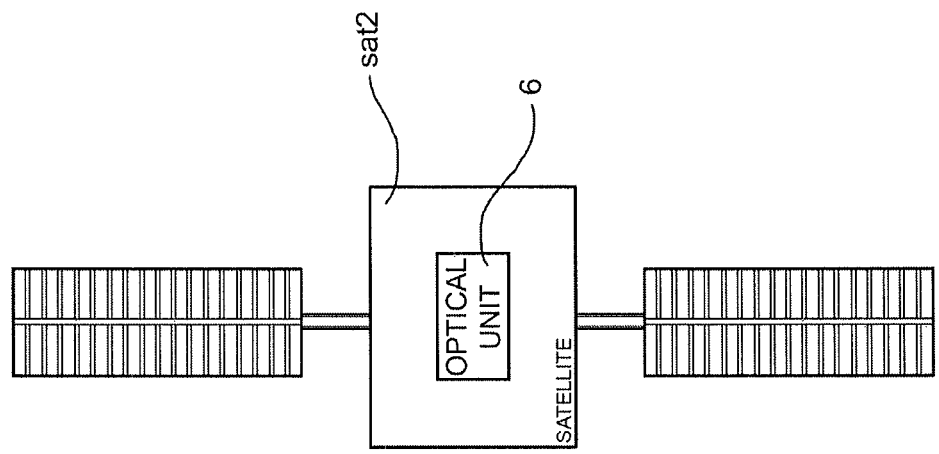
FIGS. 1, 4 and 8 show block diagrams of satellite systems including the present metrology system.
Figure 1:
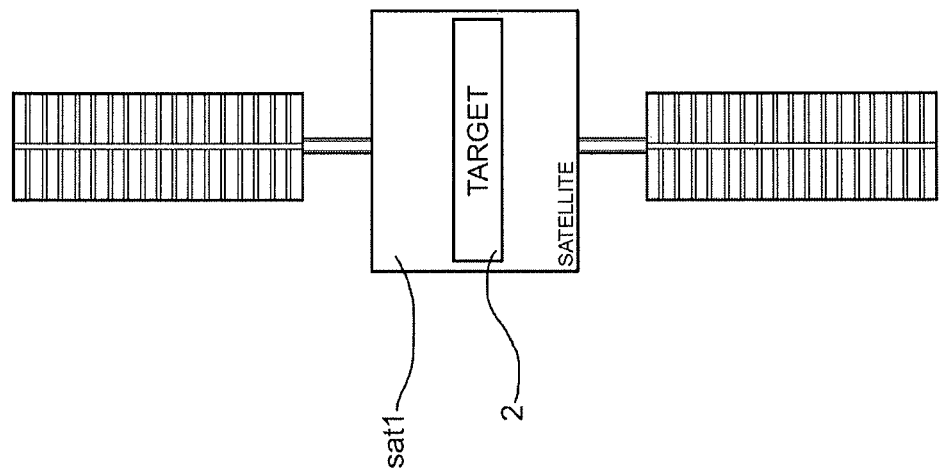

FIG. 1 shows an optical metrology system of a projective type, hereinafter referred to for brevity as "metrology system 1". The metrology system 1 is described moreover in what follows with particular reference to an application of a satellite type, even though it can find use in different spheres of application, as mentioned in the sequel.

In detail, the metrology system 1 comprises a target 2 designed to be constrained to a first satellite sat1 and an optical unit 6 designed to be constrained to a second satellite sat2.

Figure 2:
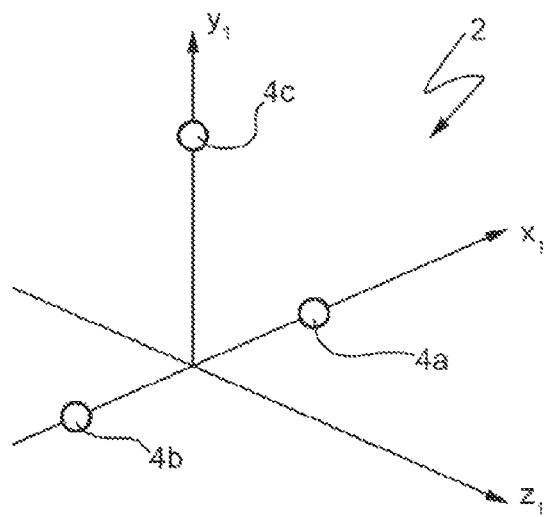
FIG. 2 is a schematic illustration of a light target.

As shown in greater detail in FIG. 2, the target 2 comprises a first light source 4a, a second light source 4b, and a third light source 4c, each formed, for example, by a corresponding light-emitting diode (LED). The first, second, and third light sources 4a-4c are arranged coplanar and at the vertices of a hypothetical triangle, for example an isosceles or equilateral triangle. In particular, on the hypothesis of point-like light sources, assuming a first reference system $x_1, y_1, z_1$ fixed with respect to the first satellite sat1 and formed by three axes $x_1, y_1, z_1$ orthogonal to one another, and assuming moreover that the axis $z_1$ is perpendicular to the plane in which the first, second, and third light sources 4a-4c lie, and that the first and second light sources 4a-4b lie along the axis $x_1$, it is possible to express the points of the space in which the first, second, and third light sources 4a-4c are located, respectively, as $[X_0,0,0]$, $[-X_0,0,0]$, and $[0, y_0,0]$.

Figure 3:
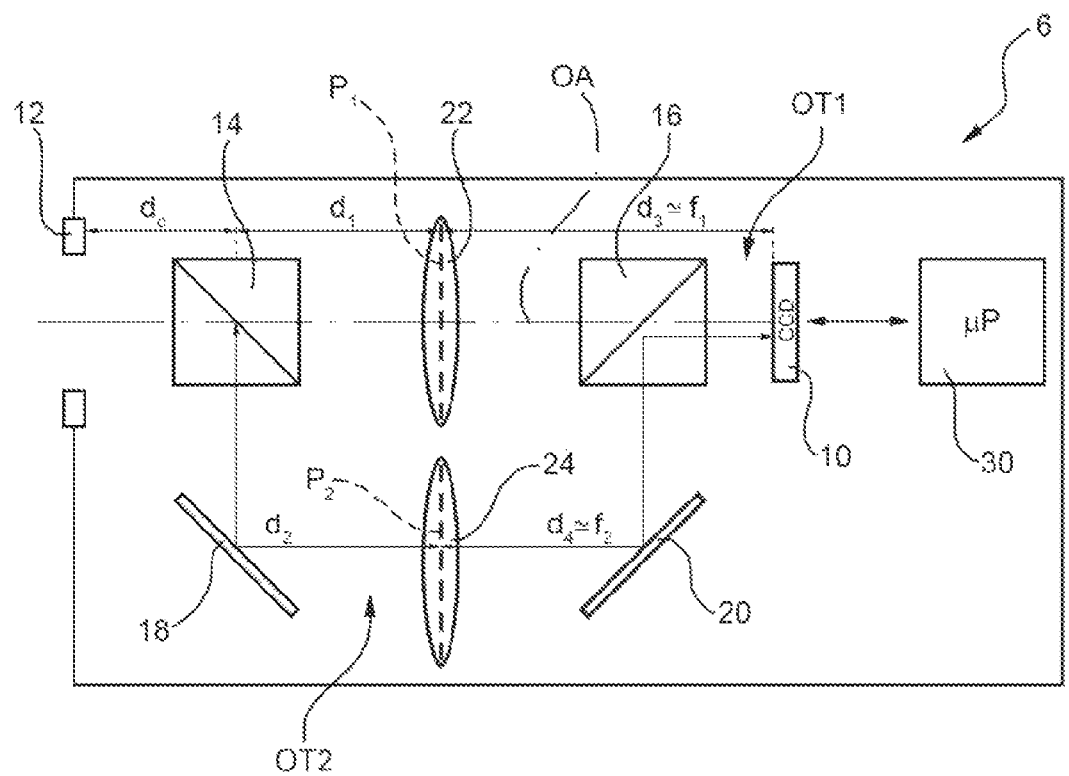
FIGS. 3 and 7 show block diagrams of an optical unit according to the present invention.

As shown in FIG. 3, the optical unit 6 comprises an optoelectronic sensor 10, a diaphragm 12 designed to receive the optical rays generated by the target 2, a first optical beam splitter 14 and a second optical beam splitter 16, first reflecting element 18 and a second reflecting element 20, and a first intermediate lens 22 and a second intermediate lens 24. Purely by way of example, the first and second intermediate lenses 22, 24 may be concave.

The optical unit 6 further comprises an electronic processing unit 30, which is electrically connected to the optoelectronic sensor 10.

In greater detail, the diaphragm 12, the first optical beam splitter 14, the first intermediate lens 22, the second optical beam splitter 16, and the optoelectronic sensor 10 are arranged in succession and optically aligned. In other words, the first optical beam splitter 14 is arranged between the diaphragm 12 and the first intermediate lens 22, which in turn is arranged between the first and second optical beam splitters 14, 16; finally, the second optical beam splitter 16 is arranged between the first intermediate lens 22 and the optoelectronic sensor 10.

In greater detail, the optical axes of the diaphragm 12 and of the first intermediate lens 22 are approximately coincident and pass substantially through the centre of the optoelectronic sensor 10. By way of example, in FIG. 3 the (coincident) optical axes of the input lens 12 and of the first intermediate lens 22 are designated by OA; for simplicity, in what follows, they will be referred to as "system axis OA".

In practice, the diaphragm 12, the first optical beam splitter 14, the first intermediate lens 22, and the second optical beam splitter 16 form a first optical circuit, which will be referred to hereinafter as "first optical train OT1".

As regards, instead, the second intermediate lens 24, it is arranged between the first and second reflecting elements 18, 20, in such a way that the diaphragm 12, the first optical beam splitter 14, the first reflecting element 18, the second intermediate lens 24, the second reflecting element 20, and the second optical beam splitter 16 form a second optical circuit, which will be referred to hereinafter as "second optical train OT2".

Figure 4:
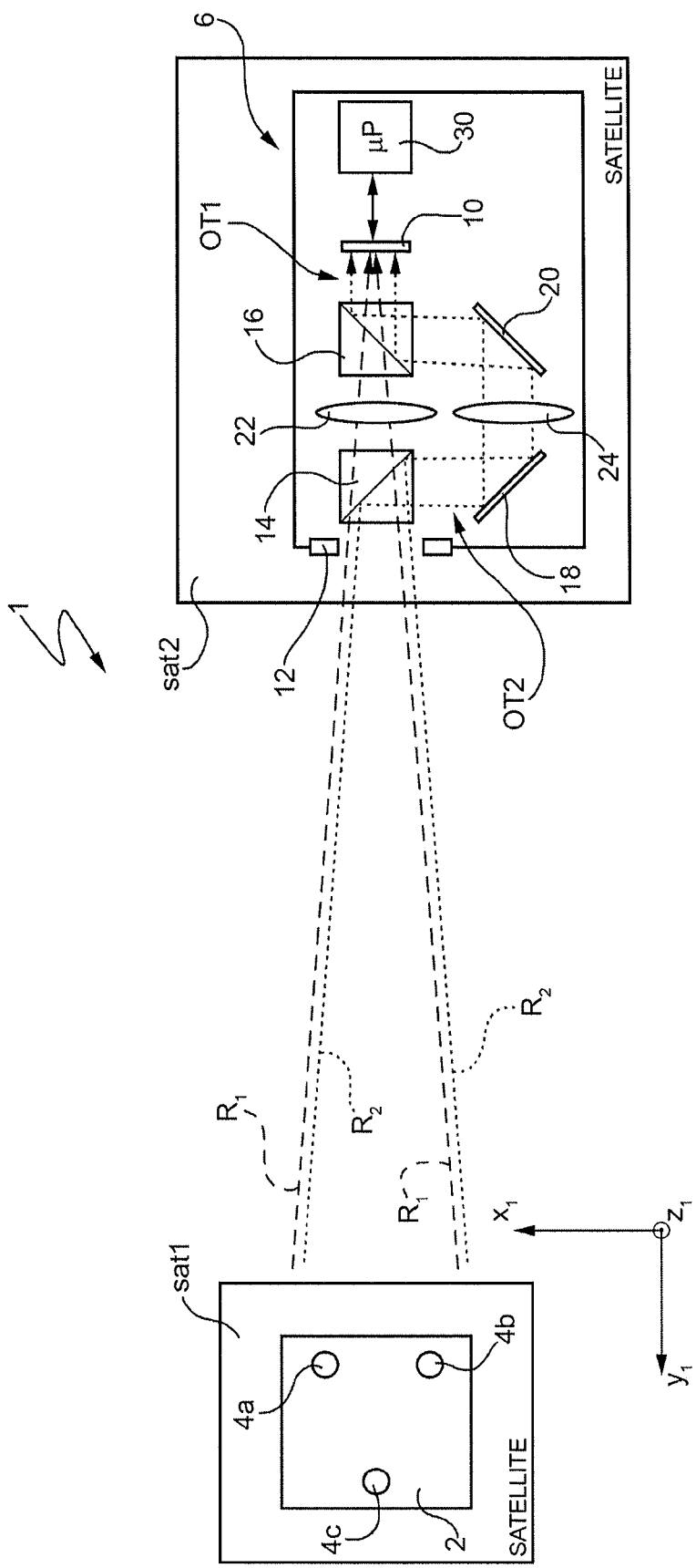

Operatively, if the optical rays generated by the target 2 and received by the diaphragm 12 are referred to as "overall optical rays", a first fraction of the overall optical rays is focused by the first optical train OT1 on the optoelectronic sensor 10, along the system axis OA, i.e., after traversing the first optical beam splitter 14, the first intermediate lens 22, and the second optical beam splitter 16. The first fraction of the overall optical rays, which will be referred to hereinafter as "first optical beam", is shown in FIG. 4 in a purely qualitative way, where it is designated by R. In practice, the first optical beam $R_1$ comprises the optical rays that traverse, in addition to the input lens 12 and the first intermediate lens 22, also the first and second optical beam splitters 14, 16, without being reflected thereby.

The first optical train OT1 hence defines a first optical path, arranged between the diaphragm 12 and the optoelectronic sensor 10 and having a first length $l_1$, understood as the distance that the first optical beam $R_1$ covers to reach, starting from the diaphragm 12, the optoelectronic sensor 10.

As regards, instead, the second optical train OT2, the first reflecting element 18 is arranged so as to receive a second fraction of overall optical rays, comprising, in the case in point, the portion of overall optical rays that, after traversing the diaphragm 12, are reflected by the first optical beam splitter 14. The second fraction of overall optical rays, which will be referred to hereinafter as "second optical beam", is shown in FIG. 4 in a purely qualitative way, where it is designated by $R_2$. In practice, the first optical beam splitter 14 operates so as to separate the first and second optical beams $R_1$, $R_2$.

The first reflecting element 18, the second intermediate lens 24, and the second reflecting element 20 are moreover arranged in such a way that the second optical beam $R_2$ is reflected by the first reflecting element 18 in the direction of the second intermediate lens 24. After traversing the second intermediate lens 24, the second optical beam $R_2$ is received by the second reflecting element 20, which reflects it in the direction of the second optical beam splitter 16. Finally, the second optical beam splitter 16 reflects the second optical beam $R_2$ in the direction of the optoelectronic sensor 10, once again along the system axis OA. In practice, the second optical beam splitter 16 operates so as to recombine the first and second optical beams $R_1$, $R_2$.

Operatively, the second optical train OT2 is able to direct the second optical beam $R_2$ towards the optoelectronic sensor 10. The second optical train OT2 hence defines a second optical path, arranged between the diaphragm 12 and the optoelectronic sensor 10 and having a second length $l_2$, greater than the first length $l_1$ and understood as the distance that the optical rays of the aforementioned second optical beam $R_2$ cover to reach, starting from the diaphragm 12, the optoelectronic sensor 10.

The second optical path does not traverse the first intermediate lens 22, and moreover shares with the first optical path one and the same input point, defined by the diaphragm 12, and one and the same terminal point, defined by the optoelectronic sensor 10.

In greater detail, each lens between the first and second intermediate lenses 22, 24 has a respective pair of principal planes, also known as front principal plane and rear principal plane, which, in the case where the lens is thin, collapse into a single principal plane. Consequently, assuming that the first and second intermediate lenses 22, 24 are effectively thin, they have, respectively, a first principal plane $P_1$ and a second principal plane $P_2$, which pass through the optical centres of the first and second intermediate lenses 22, 24, respectively. In addition, the first and second intermediate lenses 22, 24 have, respectively, a first focal length $f_1$ and a second focal length $f_2$, the second focal length $f_2$ being greater than the first focal length $f_1$.

In even greater detail, assuming for simplicity that the first optical beam splitter 14 has negligible dimensions, the first and second principal planes $P_1$, $P_2$, and hence also the first and second intermediate lenses 22, 24, are set apart from the first optical beam splitter 14, respectively, by a first distance $d_1$ and a second distance $d_2$, measured along the first and second optical paths, respectively. In other words, neglecting the inclination of the optical rays with respect to the system axis OA, the first optical beam $R_1$ propagates, to reach the first principal plane $P_1$ starting from the first beam splitter 14, over a distance equal to $d_1$. Likewise, the second optical beam $R_2$ propagates, to reach the second principal plane $P_2$ starting from the first optical beam splitter 14, over a distance equal to $d_2$.

In practice, from an optical standpoint, the first and second principal planes $P_1$, $P_2$ are set apart from the target 2, respectively, by a distance $d_{p1}=D_{sat}+d_1$ and $d_{p2}=D_{sat}+d_2$, where $D_{sat}$ is the distance between the target 2 and the first optical beam splitter 14. Consequently, from an optical standpoint, the first and second principal planes $P_1$, $P_2$ are at different distances from the target 2. Equivalently, the first and second principal planes $P_1$, $P_2$ are at different distances from the diaphragm 12, since they are at different distances from the first optical beam splitter 14, and the first and second optical paths, between the diaphragm 12 and the first optical beam splitter 14, coincide. In particular, if $d_c$ is the distance between the diaphragm 12 and the first optical beam splitter 14, the first and second principal planes $P_1$, $P_2$ are set apart from the diaphragm 12 by a distance $d_c+d_1$ and a distance $d_c+d_2$, respectively. It should be noted that $d_1$ and $d_2$ can also assume negative values, in the case where the first principal plane $P_1$ and/or the second principal plane $P_2$ are/is arranged between the diaphragm 12 and the first optical beam splitter 14.

In addition, the first and second principal planes $P_1$, $P_2$, and hence the first and second intermediate lenses 22, 24, are set apart from the optoelectronic sensor 10, respectively, by a third distance $d_3$ and a fourth distance $d_4$, measured, respectively, along the first and second optical paths. In other words, neglecting the inclination of the optical rays with respect to the system axis OA, the first optical beam $R_1$ propagates, to reach the optoelectronic sensor 10 starting from the first principal plane $P_1$, over a distance equal to $d_3$.

Likewise, the second optical beam $R_2$ propagates, to reach the optoelectronic sensor 10 starting from the second principal plane $P_2$, over a distance equal to $d_4$.

Figure 5:
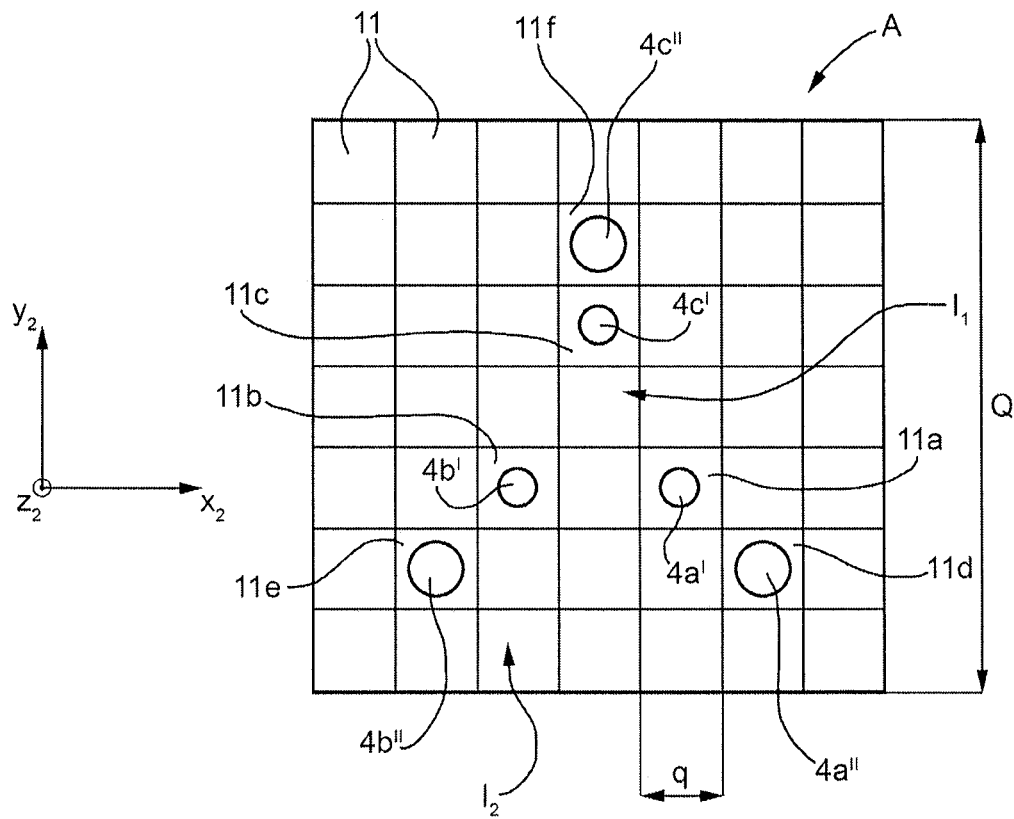
FIG. 5 is a qualitative illustration of a front view of a detection surface of an optoelectronic sensor of the metrology system illustrated in FIGS. 1, 4 and 8.

In greater detail, as shown in FIG. 5, the optical sensor 10 can be formed, for example, by a charge-coupling device (CCD), and has a detection surface A having, for example, a square shape. The aforementioned third and fourth distances $d_3$ and $d_4$ express precisely the distances of the first and second principal planes $P_1$, $P_2$ from the detection surface A.

The detection surface A is formed by an array of M image elements generally known as pixels 11 and is arranged, as mentioned previously, in a direction perpendicular to the system axis OA, i.e., in a direction perpendicular to the optical axes of the diaphragm 12 and of the first intermediate lens 22. Moreover, the geometrical centre of the detection surface A preferably lies along the system axis OA. In practice, the optoelectronic sensor 10 is a so-called image sensor.

Once again with reference to the third and fourth distances $d_3$, $d_4$, preferably they are substantially equal, respectively, to the first and second focal lengths $f_1$ and $f_2$. Consequently, given a hypothetical light source set at an infinite distance from the second satellite sat2, the corresponding first and second optical beams $R_1$, $R_2$ are focused substantially in a single point of the detection surface A of the optical sensor 10.

As regards, instead, the target 2, set inevitably at a non-infinite distance from the second satellite sat2, in a position corresponding to the optical sensor 10 a first image and a second image of the target 2 itself are formed.

In greater detail, as shown qualitatively in FIG. 4, the first and second focal lengths $f_1$ and $f_2$ are such that, when the first satellite sat1, and hence the target 2, are at the distance $D_{sat}$ from the second satellite sat2, or rather from the first optical beam splitter 14, both the first optical beam $R_1$ and the second optical beam $R_2$ impinge effectively on the detection surface A of the optical sensor 10, there concurring in determining a first distribution of M light intensities, as detected by the M pixels 11 of the optical sensor 10.

In particular, as shown in FIG. 5, the first optical beam $R_1$ forms on the detection surface A of the optical sensor 10 a first image $I_1$ of the target 2, formed by a first image dot 4a', a second image dot 4b', and a third image dot 4c' corresponding, respectively, to the first, second, and third light sources 4a-4c. Moreover, also the second optical beam $R_2$ impinges upon the detection surface A of the optical sensor 10 and concurs, hence, to forming the first distribution of M light intensities. In particular, the second fraction $R_2$ of overall optical rays form on the detection surface A of the optical sensor 10 a second image $I_2$ of the target 2, formed by a fourth image dot 4a'', a fifth image dot 4b'', and a sixth image dot 4c'', corresponding, respectively, to the first, second, and third light sources 4a-4c. It should be noted that, for simplicity of exposition, in FIG. 5 it is assumed that each image dot excites a single pixel, even though typically each image dot excites a number of pixels greater than one.

On the basis of the first distribution of M light intensities, the electronic processing unit 30 is able to determine a first pixel, a second pixel, and a third pixel designated by 11a, 11b, and 11c, respectively, which correspond, respectively, to the first, second, and third image dots 4a'-4c'. In addition, the electronic processing unit 30 is able to determine a fourth pixel, a fifth pixel, and a sixth pixel, designated by 11d, 11e, and 11f, respectively, which correspond to the fourth, fifth, and sixth image dots 4a"-4c", respectively.

For example, the electronic processing unit 30 can identify the first, second, third, fourth, fifth, and sixth pixels 11a-11f by means of a search for the relative maxima between the M light intensities of the first distribution of M light intensities. In this case, in a way in itself known, the first, second, third, fourth, fifth, and sixth pixels 11a-11f are characterized in that, considering any one of them, the light intensity detected thereby is greater than the light intensities detected by the pixels surrounding it.

In other words, the first, second, third, fourth, fifth, and sixth image dots 4a'-4c', 4a"-4c" can be identified electronically as distinct from one another, and in particular as corresponding to six different pixels. This means that both the first image $I_1$ and the second image $I_2$ are clear; namely, each of them can be processed electronically by the electronic processing unit 30 in such a way as to identify, in a way in itself known, a number of relative maxima of light intensity equal to the number of light sources present in the target 2 (in the case in point, three).

Instead, if, hypothetically, the first, second, and third image dots 4a'-4c' were all to excite one and the same pixel, they would not be identifiable electronically as distinct from one another; hence, the first image $I_1$ of the target 2 would not be clear.

In practice, the fact that a generic image formed on the detection surface A of the optical sensor 10 is clear depends, in a way in itself known, upon the dimensions of the target 2, the distance of the target 2 from the second satellite sat2, the focal length of the corresponding optical train that has generated it, as well as the area of the detection surface A of the optical sensor 10. In this connection, in what follows, it will be assumed, without this implying any loss of generality, that the detection surface A has a square shape of side Q, and that each pixel 11 has a square shape of side q.

Moreover, strictly speaking, the fact that a generic image is clear or otherwise depends upon the (known) processing techniques adopted by the electronic processing unit 30 to process the distribution of M light intensities detected by the M pixels 11. In fact, even though it is possible, as described previously, that the electronic processing unit 30 determines the relative maxima of light intensity directly on the basis of the light intensities detected by the pixels 11, it is moreover possible that the determination of the relative maxima is carried out by means of the so-called centroid method, or similar methods. In particular, the centroid method, described for example in "Error analysis of CCD-based point source centroid computation under the background light", by Xiaoyu Ma, Changhui Rao and Hanging Zheng, OPTICS EXPRESS Vol. 17, No. 10 and in "Improved Iteration Centroid Algorithm Based on Linear CCD Light-spot Location", Shengjin Tang, Zhaofa Zhou, Xiaosong Guo, Yongchao Xiao, The Ninth International Conference on Electronic Measurement & Instruments, ICEMI 2009, envisages interpolation of the light intensities detected by the pixels 11, in themselves discretized in space, in order to determine space-continuous interpolating curves (for example, Gaussian curves), on the basis of which the relative maxima are determined.

It should be noted that, in the case where the electronic processing unit 30 determines the relative maxima of light intensity merely on the basis of the light intensities detected by the pixels 11, without operations of interpolation, a generic image is clear if the electronic processing unit 30 is able to identify, for each image dot of the generic image, a corresponding pixel that exhibits a relative maximum of light intensity. If this occurs, the electronic processing unit 30 associates the image dots to the co-ordinates of the corresponding pixels. For example, in the case of the first, second, third, fourth, fifth, and sixth image dots 4a'-4c' and 4a"-4c", they are, respectively, associated to the co-ordinates (described hereinafter) of the first, second, third, fourth, fifth, and sixth pixels 11a-11f. Consequently, the maximum discretization that it is possible to achieve in determining the position, within the detection surface A, of possible image dots is equal to the side q of a single pixel.

Instead, by adopting known interpolation techniques, such as for example the centroid method, it is possible to obtain a spatial discretization lower than q, i.e., it is possible to associate to the image dots co-ordinates with a discretization lower than q. In fact, for an image to be clear it is sufficient for the electronic processing unit 30 to be able to identify, on the basis of the M light intensities detected by the pixels 11 and in a way in itself known, a number of relative maxima of light intensity equal to the number of light sources present in the target 2, irrespective of whether, on the basis of the light intensities detected by the pixels and of the search alone for the relative maxima between said light intensities, it is possible to identify a number of pixels corresponding to the number of light sources present in the target 2. For example, the identification of a number of pixels corresponding to the number of light sources present in the target 2 can be prevented by the fact that this search supplies a number of relative maxima lower or higher than the number of light sources.

For simplicity of description, in what follows it will be assumed, except where otherwise specified, that the electronic processing unit 30 determines the relative maxima of light intensity merely on the basis of the search for the relative maxima between the light intensities detected by the pixels 11, without operations of interpolation, and hence that the first, second, third, fourth, fifth, and sixth image dots 4a'-4c' and 4a"-4c" are associated, respectively, to the co-ordinates of the first, second, third, fourth, fifth, and sixth pixels 11a-11f.

Once again with reference to the first and second images $I_1$ and $I_2$ shown in FIG. 5, assuming a second reference system $x_2$, $y_2$, $z_2$ formed by three axes $x_2$, $y_2$, $z_2$ orthogonal to one another, fixed with respect to the second satellite sat2 and such that the detection surface A of the optical sensor 10 lies in the plane defined by the axes $x_2$ and $y_2$, the co-ordinates of each of the first, second, and third pixels 11a-11c can be expressed as triads, respectively, of the type $[X_{1P}, y_{1P}, 0]$, $[X_{2P}, Y_{2P}, 0]$ and $[X_{3P}, y_{3P}, 0]$. Likewise, the co-ordinates of each of the fourth, fifth, and sixth pixels 11e-11f can be expressed as triads, respectively, of the type $[X'_{1P}, y'_{1P}, 0]$, $[X'_{2P}, Y'_{2P}, 0]$ and $[X'_{3P}, y'_{3P}, 0]$.

Next, on the basis of the triads of co-ordinates associated to the first, second, third, fourth, fifth, and sixth image dots 4a'-4c', 4a"-4c", and on the basis of the shape of the target 2, i.e., on the basis of the triads of co-ordinates of the first, second, and third light sources 4a-4c, the electronic processing unit 30 determines six quantities for mutual attitude and mutual position of the first and second satellites sat1, sat2. In particular, the electronic processing unit 30 determines the angles θ, β, γ, a distance D, and the displacements Δx, Δy, which refer to rotations or translations that enable, starting from the six triads of co-ordinates associated to the first, second, third, fourth, fifth, and sixth pixels 11a-11f, the co-ordinates of the first, second, and third light sources 4a-4c to be obtained.

In greater detail, the angles θ, β, γ refer, respectively, to rotations about the axes $x_1$, $y_1$ and $z_1$, whilst the displacements Δx, Δy refer to translations along the axes $y_1$. The distance D, instead, is the distance between the target 2 and the first optical beam splitter 14, i.e., to a first approximation, the distance between the first and second satellites sat1, sat2.

Still more in particular, in a way in itself known, assuming a mutual reference arrangement of the first reference system $x_1$, $y_1$ and $z_1$ with respect to the second reference system $x_2$, $y_2$ and $z_2$, the angles θ, β, γ and the displacements Δx, Δy indicate corresponding rototranslations of the first reference system $x_1$, $y_1$ and $z_1$ with respect to this mutual reference arrangement.

Operatively, the electronic processing unit 30 resorts to the so-called homogeneous co-ordinates, in themselves known in the field of projective geometry. In particular, the electronic processing unit 30 uses a three-dimensional reference system in homogeneous co-ordinates, of a right-hand type, i.e., where the positive rotations are the rotations in a counter-clockwise direction. Consequently, translations and rotations can be expressed, in a way in itself known, in terms of corresponding four-by-four matrices. With reference to the aforementioned angles θ, β, γ, the corresponding rotations can hence be expressed as $$R_z(\gamma) = \begin{bmatrix} \cos\gamma & \sin\gamma & 0 & 0 \\ -\sin\gamma & \cos\gamma & 0 & 0 \\ 0 & 0 & 1 & 0 \\ 0 & 0 & 0 & 1 \end{bmatrix} \quad (1)$$

$$R_x(\vartheta) = \begin{bmatrix} 1 & 0 & 0 & 0 \\ 0 & \cos\vartheta & \sin\vartheta & 0 \\ 0 & -\sin\vartheta & \cos\vartheta & 0 \\ 0 & 0 & 0 & 1 \end{bmatrix} \quad (2)$$

$$R_y(\beta) = \begin{bmatrix} \cos\beta & 0 & -\sin\beta & 0 \\ 0 & 1 & 0 & 0 \\ \sin\beta & 0 & \cos\beta & 0 \\ 0 & 0 & 0 & 1 \end{bmatrix} \quad (3)$$

whilst a generic translation, formed by a generic triad of displacements of the type [Sx, Sy, Sz], can be expressed as $$T_{xyz}(Sx, Sy, Sz) = \begin{bmatrix} 1 & 0 & 0 & 0 \\ 0 & 1 & 0 & 0 \\ 0 & 0 & 1 & 0 \\ Sx & Sy & Sz & 1 \end{bmatrix} \quad (4)$$

Given a generic rigid body the centroid of which initially has cartesian co-ordinates $[X_{01}, y_{01}, z_{01}]$, and which is subjected to rotations and/or translations, it is thus possible to determine mathematically a new triad of cartesian co-ordinates $[X_{11}, y_{11}, z_{11}]$, corresponding to the position assumed by the centroid of the rigid body following upon rotations and/or translations. For this purpose, it is possible to apply to the homogeneous co-ordinates $[X_{01}, y_{01}, z_{01}, 1]$, corresponding to the initial position of the rigid body, the aforementioned rotation matrix and/or translation matrix, in the same order with which the rotations and/or translations effectively occur. We have in fact $$[X_{11}, y_{11}, z_{11}, 1] = [X_{01}, y_{01}, z_{01}, 1] \cdot R_x(\theta) \cdot R_y(\beta) \cdot R_z(\gamma) \cdot T_{xyz}(\Delta x, \Delta y, \Delta z) \quad (5)$$

In other words, the equation that links the final homogeneous co-ordinates assumed by the centroid of the rigid body to the initial homogeneous co-ordinates assumed by the centroid of the rigid body is $$[X_{11}, y_{11}, z_{11}, 1] = [X_{01}, y_{01}, z_{01}, 1] \cdot M(\theta, \beta, \gamma, \Delta x, \Delta y, \Delta z) \quad (6)$$

where the matrix M defines mathematically any rototranslation to which the rigid body is subject and has the following form $$M = \quad (7)$$
$$\begin{bmatrix} \cos\gamma\cos\beta & \sin\gamma\cos\beta & -\sin\beta & 0 \\ \sin\vartheta\sin\beta\cos\gamma - \sin\gamma\cos\vartheta & \sin\gamma\sin\beta\sin\vartheta + \cos\gamma\cos\vartheta & \sin\vartheta\cos\beta & 0 \\ \cos\vartheta\sin\beta\cos\gamma - \sin\gamma\sin\vartheta & \sin\gamma\sin\beta\cos\vartheta - \cos\gamma\sin\vartheta & \cos\vartheta\cos\beta & 0 \\ \Delta x & \Delta y & \Delta z & 1 \end{bmatrix}$$

Figure 6:
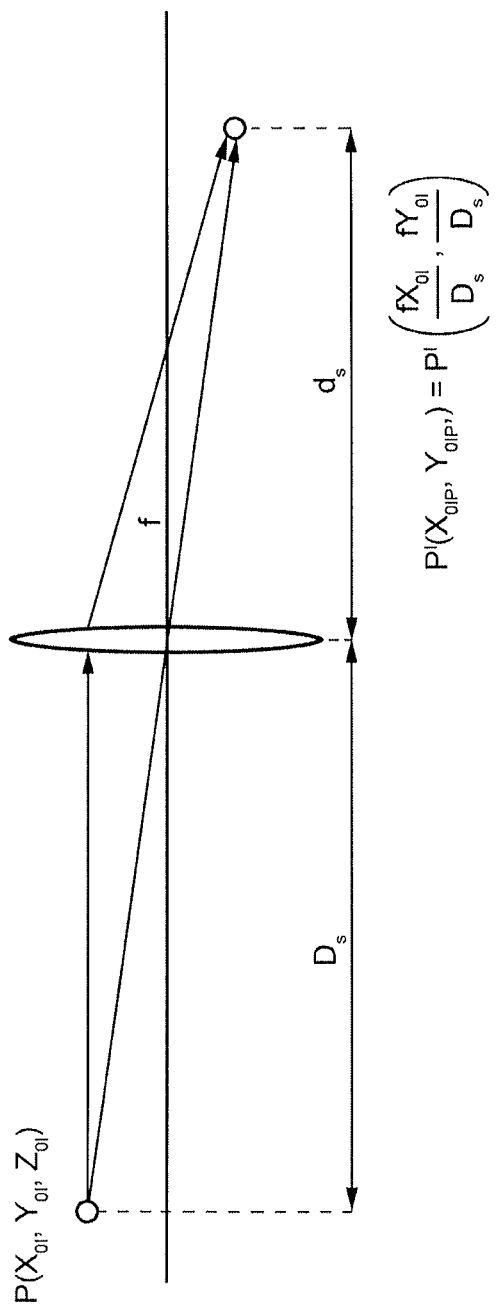
FIG. 6 shows an optical diagram regarding formation of an image.

It is moreover known that, as shown schematically in FIG. 6, given a generic thin lens with focal length f, if a point-like object having cartesian co-ordinates $[X_{01}, y_{01}, z_{01}]$ is set in front of the thin lens and at a distance $D_s$ therefrom, it generates, in a hypothetical plane arranged behind the thin lens and at a distance $d_s$ approximately equal to the focal length f, a corresponding image dot having co-ordinates approximately equal to $X_{01P} = X_{01} \cdot f/D_s$ and $Y_{01P} = Y_{01} \cdot f/D_s$. This physical phenomenon is expressed by the well-known equation of optical projection $$P'(X_{01P}, Y_{01P}) = P'\left(\frac{fX_{01}}{D_s}, \frac{fY_{01}}{D_s}\right) \quad (8)$$

Substituting the equation of optical projection (8) in Eq. (6), we obtain $$\left[X_{11P}, Y_{11P}, 0, \frac{f}{D_s}\right] = \frac{f}{D_s}[X_{01}, Y_{01}, 0, 1] \begin{bmatrix} \cos\gamma\cos\beta & \sin\gamma\cos\beta & -\sin\beta & 0 \\ \sin\vartheta\sin\beta\cos\gamma - \sin\gamma\cos\vartheta & \sin\gamma\sin\beta\sin\vartheta + \cos\gamma\cos\vartheta & \sin\vartheta\cos\beta & 0 \\ \cos\vartheta\sin\beta\cos\gamma - \sin\gamma\sin\vartheta & \sin\gamma\sin\beta\cos\vartheta - \cos\gamma\sin\vartheta & \cos\vartheta\cos\beta & 0 \\ \Delta x & \Delta y & \Delta z & 1 \end{bmatrix} \quad (9)$$

which sets in relation the co-ordinates $[X_{01}, y_{01}, z_{01}]$ of the centroid of the rigid body prior to the rototranslation with the co-ordinates $[X_{11P}, y_{11P}, z_{11P}]$ of the image dot for the same centroid, after the rigid body has undergone a rototranslation. More in particular, the co-ordinates $[X_{01}, y_{01}, 0]$ regard a reference system such that $Z_{01}=0$, whereas the co-ordinates $[X_{11P}, y_{11P}, 0]$ regard a reference system such that $Z_{11P}=0$.

This being said, with reference to the reference systems $x_1$, $y_1$, $z_1$ and $x_2$, $y_2$, $z_2$, if we assume that the angle $\theta$ is zero and we apply Eq. (9) with reference to the first light source $4a$ and to the first image dot $4a'$, we obtain $$\left[X_{1P}, Y_{1P}, 0, \frac{f_1}{D+d_1}\right] = \qquad (10)$$

$$\frac{f_1}{D+d_1}[X_0, 0, 0, 1]\begin{bmatrix} \cos\gamma\cos\beta & \sin\gamma\cos\beta & -\sin\beta & 0 \\ -\sin\gamma & \cos\gamma & 0 & 0 \\ \sin\beta\cos\gamma & \sin\gamma\sin\beta & \cos\beta & 0 \\ \Delta x & \Delta y & \Delta z & 1 \end{bmatrix}$$

Likewise, if we assume once again that the angle $\theta$ is zero, and we apply Eq. (9) with reference to the second light source $4b$ and to the second image dot $4b'$, we obtain $$\left[X_{2P}, Y_{2P}, 0, \frac{f_1}{D+d_1}\right] = \qquad (11)$$

$$\frac{f_1}{D+d_1}[-X_0, 0, 0, 1]\begin{bmatrix} \cos\gamma\cos\beta & \sin\gamma\cos\beta & -\sin\beta & 0 \\ -\sin\gamma & \cos\gamma & 0 & 0 \\ \sin\beta\cos\gamma & \sin\gamma\sin\beta & \cos\beta & 0 \\ \Delta x & \Delta y & \Delta z & 1 \end{bmatrix}$$

Rendering explicit the matrix forms and subtracting Eq. (11) from Eq. (10) member by member, we obtain the pair of equations $$\begin{cases} X_{1P} - X_{2P} = \Delta X_{12P} = \dfrac{2f_1}{D+d_1}X_0\cos\gamma\cos\beta \\ Y_{1P} - Y_{2P} = \Delta Y_{12P} = \dfrac{2f_1}{D+d_1}X_0\sin\gamma\cos\beta \end{cases} \qquad (12)$$

Operating on the pair constituted by the first light source $4a$ and the fourth image dot $4a''$ and on the pair constituted by the second light source $4b$ and the fifth image dot $4b''$ in a way similar to what is described, respectively, with reference to the pair constituted by the first light source $4a$ and the first image dot $4a'$ and to the pair constituted by the second light source $4b$ and the second image dot $4b'$, we obtain the pair of equations $$\begin{cases} X'_{1P} - X'_{2P} = \Delta X'_{12P} = \dfrac{2f_2}{D+d_2}X_0\cos\gamma\cos\beta \\ Y'_{1P} - Y'_{2P} = \Delta Y'_{12P} = \dfrac{2f_2}{D+d_2}X_0\sin\gamma\cos\beta \end{cases} \qquad (13)$$

In practice, the pairs of equations (12) and (13) are obtained on the basis, respectively, of the first and second images $I_1$ and $I_2$ of the target $2$, as supplied, respectively, by the first and second optical trains OT1 and OT2, which have different focal lengths equal, respectively, to the first and second focal lengths $f_1$, $f_2$ of the first and second intermediate lenses $22$, $24$. In addition, the first and second intermediate lenses $22$, $24$ are arranged at different optical distances from the target $2$.

On the basis of the two pairs of equations (12) and (13), it is thus possible to obtain $$\gamma = \arctan\left(\frac{\Delta Y_{12P}}{\Delta X_{12P}}\right) \qquad (14)$$

$$D = \frac{f_1 d_2 \Delta X'_{12P} - f_2 d_1 \Delta X_{12P}}{f_1 \Delta X_{12P} - f_2 \Delta X'_{12P}}$$

$$\beta = \arccos\left(\frac{\Delta X_{12P}(D+d_1)}{2f_1 X_0 \cos\left(\text{atan}\left(\frac{\Delta Y_{12P}}{\Delta X_{12P}}\right)\right)}\right)$$

Once the angles $\gamma$, $\beta$ and the distance D are known, the displacements $\Delta x$, $\Delta y$ can be determined on the basis of the following pair of equations $$\begin{cases} \Delta x = \Delta X_{12P} - \dfrac{f_1}{D+d_1}X_0\cos\gamma\cos\beta \\ \Delta y = \Delta Y_{12P} - \dfrac{f_1}{D+d_1}X_0\sin\gamma\cos\beta \end{cases} \qquad (15)$$

Finally, the angle $\theta$ can be determined by applying Eq. (9) with reference to the third light source $4c$ and to the third image dot $4c'$, as well as on the basis of the angles $\gamma$, $\beta$ and of the displacements $\Delta x$, $\Delta y$ just determined. In particular, applying Eq. (9) with reference to the third light source $4c$ and to the third image dot $4c'$ we obtain $$\left[X_{3P}, Y_{3P}, 0, \frac{f_1}{D+d_1}\right] = \frac{f_1}{D+d_1}[0, Y_0, 0, 1]\begin{bmatrix} \cos\gamma\cos\beta & \sin\gamma\cos\beta & -\sin\beta & 0 \\ \sin\vartheta\sin\beta\cos\gamma - \sin\gamma\cos\vartheta & \sin\gamma\sin\beta\sin\vartheta + \cos\gamma\cos\vartheta & \sin\vartheta\cos\beta & 0 \\ \cos\vartheta\sin\beta\cos\gamma + \sin\gamma\sin\vartheta & \sin\gamma\sin\beta\cos\vartheta - \cos\gamma\sin\vartheta & \cos\vartheta\cos\beta & 0 \\ \Delta x & \Delta y & \Delta z & 1 \end{bmatrix} \qquad (16)$$

Rendering explicit Eq. (16), we obtain $$\begin{cases} X_{3P} = \dfrac{f_1 Y_0}{D+d_1}\left(\sin\vartheta\sin\beta\cos\gamma - \sin\gamma\cos\vartheta + \dfrac{\Delta x}{Y_0}\right) \\ Y_{3P} = \dfrac{f_1 Y_0}{D+d_1}\left(\sin\vartheta\sin\beta\sin\gamma + \cos\gamma\cos\vartheta + \dfrac{\Delta y}{Y_0}\right) \end{cases} \qquad (17)$$

The trigonometric system (17) can be transformed into a pair of parametric equations imposing the conditions $$\begin{cases} m = \sin\vartheta \\ n = \sin\beta \end{cases} \qquad (18)$$

and collecting the known term adopting the following notations $$\begin{cases} a_1 = \cot\gamma \\ a_2 = \tan\gamma \end{cases} \qquad (19)$$

$$P(D) = \frac{f_1 Y_0}{D+d_1} \qquad (20)$$

and $$b_1 = \frac{X_{3P}}{P(D)\sin\gamma} - \frac{\Delta x}{Y_0 \sin\gamma} \quad (21)$$
$$b_2 = \frac{Y_{3P}}{P(D)\cos\gamma} - \frac{\Delta y}{Y_0 \cos\gamma}$$

so that the trigonometric system (17) becomes $$\begin{cases} (a_1 mn - b_1)^2 = 1 - m^2 \\ (-a_2 mn + b_2)^2 = 1 - m^2 \end{cases} \Rightarrow (a_1 mn - b_1)^2 = \quad (22)$$

$$(-a_2 mn + b_2)^2 \Rightarrow m = \frac{b_1 + b_2}{n(a_1 + a_2)}$$

The angle $\theta$ is hence equal to $$\vartheta = \arcsin\left(\frac{b_1 + b_2}{\sin(\beta)(a_1 + a_2)}\right) \quad (23)$$

Summarizing, we hence have $$\begin{cases} \vartheta = \arcsin\left(\frac{\frac{X_{3P}}{P(D)\sin\gamma} + \frac{\Delta x}{Y_0 \sin\gamma} + \frac{Y_{3P}}{P(D)\cos\gamma} + \frac{\Delta y}{Y_0 \cos\gamma}}{\sin(\beta)(\cot an\gamma + \tan\gamma)}\right) \\ \beta = \arccos\left(\frac{\Delta X_{12P}(D + d_1)}{2f_1 X_0 \cos\left(atan\left(\frac{\Delta Y_{12P}}{\Delta X_{12P}}\right)\right)}\right) \\ \gamma = \arctan\left(\frac{\Delta Y_{12P}}{\Delta X_{12P}}\right) \\ D = \frac{f_1 d_2 \Delta X'_{12P} - f_2 d_1 \Delta X_{12P}}{f_1 \Delta X_{12P} - f_2 \Delta X'_{12P}} \\ \Delta x = \Delta X_{12P} - \frac{f_1}{D - f_1} X_0 \cos\gamma \cos\beta \\ \Delta y = \Delta Y_{12P} - \frac{f_1}{D - f_1} X_0 \sin\gamma \cos\beta \end{cases} \quad (24)$$

In practice, the metrology system 1, of a bifocal type, enables determination in an analytical and non-ambiguous way of all six degrees of freedom that characterize the position and attitude of the target 2 with respect to the optical unit 6. This is due to the fact of having available two different images of the target 2, obtained by means of two optical systems (in the case in point, the first and second optical trains OT1 and OT2) that share one and the same input point of the optical rays, have principal planes that are at different distances from the target and have different focal lengths. In this way, two different images of the target 2 are formed on the detection surface A.

In general, in order to enable clear formation of the first and second images $I_1$, $I_2$ when the target 2 is set at a design distance $D_{prog}$ from the optical unit 6, it is possible to determine the first and second focal lengths $f_1$, $f_2$ as described hereinafter.

In this connection, it is premised that, given any distance between the first and second satellites sat1 and sat2, the first and second optical trains OT1 and OT2 produce, in a hypothetical plane extending at infinity and containing the detection surface A, two different images of the target 2. In particular, the image produced by the second optical train OT2 has greater dimensions than that produced by the first optical train OT1, because the second focal length $f_2$ is greater than the first focal length $f_1$, and hence the second optical train OT2 is characterized, as compared to the first optical train OT1, by a greater enlargement.

This being said, it is possible to determine the first and second focal lengths $f_1$, $f_2$ on the basis of the target 2 and of the detection surface A, so that, when the target 2 is at the design distance $D_{prog}$, the first and second images $I_1$, $I_2$ are contained within the detection surface A and are clear. In this connection, it may be noted that, given for simplicity of calculation a simplified target (not shown) formed by just two light sources set at a distance O from one another, the corresponding first image is certainly clear if it occupies at least two pixels of the optical sensor 11. For this purpose, it is possible to impose $f_1=(D_{prog}-H_q)/O$, where $H_q$ is equal to $2 \cdot q$ (where q is the length of the side of a pixel). Since the first image is clear, also the corresponding second image will be clear, in so far as it is obtained with an optical train having greater enlargement; however, the second focal length $f_2$ must be such that the second image is contained entirely within the detection surface A. For this purpose, it is possible to impose $f_2 < (D_{prog} \cdot Q)/O$, where Q is precisely the length of the side of the detection surface A.

Figure 7:
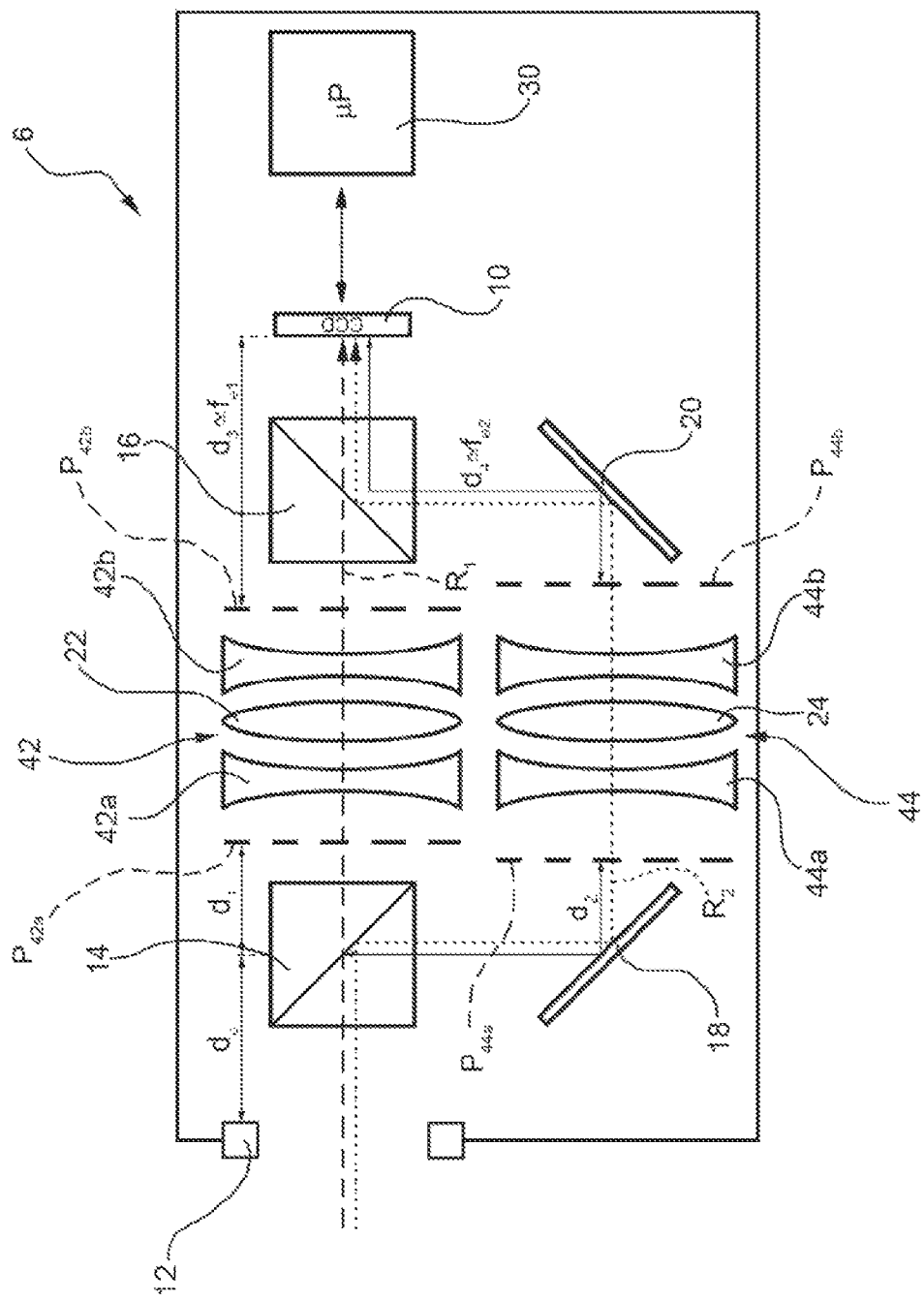

As shown in FIG. 7, moreover possible is an embodiment in which the optical unit 6 comprises a first optical unit 42 and a second optical unit 44, each of which is formed by a number of lenses. Purely by way of example, in the embodiment shown in FIG. 7 the first optical unit 42 comprises, in addition to the first intermediate lens 22, a third intermediate lens 42a and a fourth intermediate lens 42b, arranged between which is the first intermediate lens 22. Likewise, the second optical unit 44 comprises, in addition to the second intermediate lens 24, a fifth intermediate lens 44a and a sixth intermediate lens 44b, arranged between which is the second intermediate lens 24. In the case where there are the first and second optical units 42, 44, as on the other hand in the case where the first and second intermediate lenses 22, 24 are not thin, the first and second optical trains OT1 and OT2 each have a respective pair of principal planes. In this case, as shown qualitatively in FIG. 7, the first optical unit 42 defines, in addition to the first principal plane, here designated by $P_{42a}$, a third principal plane $P_{42b}$. Likewise, the second optical unit 44 defines, in addition to the second principal plane, here designated by $P_{44a}$, a fourth principal plane $P_{44b}$. Moreover, as shown once again in FIG. 7, the first and second principal planes $P_{42a}$, $P_{44a}$ do not necessarily pass through the optical centres of the first and second intermediate lenses 22, 24.

Purely by way of example, in the embodiment shown in FIG. 7 the first principal plane $P_{42a}$ lies between the first optical beam splitter 14 and the third intermediate lens 42a, whilst the second principal plane $P_{44a}$ lies between the first reflecting element 18 and the fifth intermediate lens 44a. Moreover, the third principal plane $P_{44b}$ lies between the fourth intermediate lens 42b and the second optical beam splitter 16, whilst the fourth principal plane $P_{44b}$ lies between the sixth intermediate lens 44b and the second reflecting element 20.

In practice, the first and third principal planes $P_{42a}$, $P_{42b}$ form, respectively, the front principal plane and the rear principal plane of the first optical unit 42, whilst the second and fourth principal planes $P_{44a}$, $P_{44b}$ form, respectively, the front principal plane and the rear principal plane of the second optical unit 44.

In a way in itself known, each between the first and second optical units 42, 44 moreover has a so-called front effective focal length and a rear effective focal length.

If the rear effective focal lengths of the first and second optical units 42, 44, respectively, are referred to as "first and second equivalent focal lengths $f_{e1}$, $f_{e2}$", and if $d_3$ and $d_4$ are the distances of the third and fourth principal planes $P_{42b}$, $P_{44b}$ from the optoelectronic sensor 10, the latter can be approximately equal, respectively, to the first and second equivalent focal lengths $f_{e1}$, $f_{e2}$.

In greater detail, it is again possible to designate by $d_1$ and $d_2$ the distances of the first and second principal planes $P_{42a}$, $P_{44a}$ from the first optical beam splitter 14. Moreover, the first and third distances $d_1$, $d_3$ are once again measured along the first optical path, whilst the second and fourth distances $d_2$ and $d_4$ are once again measured along the second optical path. This being said, in the case of the embodiment illustrated in FIG. 7, Eqs. (10-24) are modified accordingly, by replacing the first and second focal lengths $f_1$, $f_2$, respectively, with the first and the second equivalent focal lengths $f_{e1}$, $f_{e2}$, without any decay of the levels of performance of the optical unit 6. In addition, the presence of the first and second optical units 42, 44 enables an improvement of the immunity of the optical unit 6 to optical phenomena such as, for example, aberration.

Moreover possible are embodiments in which the optoelectronic sensor 10 comprises an additional detection surface, for example equal to the detection surface A, and where the second optical path terminates on this additional detection surface, instead of on the detection surface A. In this case, the second image $I_2$ of the target 2 is formed on the additional detection surface.

Still different embodiments are moreover possible, where the target has a number $N_s$ of light sources, with $N_s$ other than three and where the optical unit 6 is provided with further optical trains in such a way that it is designed to form, on the detection surface A, a number $N_I$ of images, where $N_I$ is the total number of optical trains present in the optical unit 6. For example, we may have $N_s=2$ and $N_I=3$. In fact, by increasing the number of images, it is possible to reduce the number of light sources of the target, without foregoing determination of any of the aforementioned quantities. It is moreover possible that the electronic processing unit 30 will determine quantities different from the angles θ, β, γ, the distance D, and the displacements Δx, Δy, such as for example quantities referenced to non-cartesian reference systems, or else a subset of these quantities.

Figure 8:
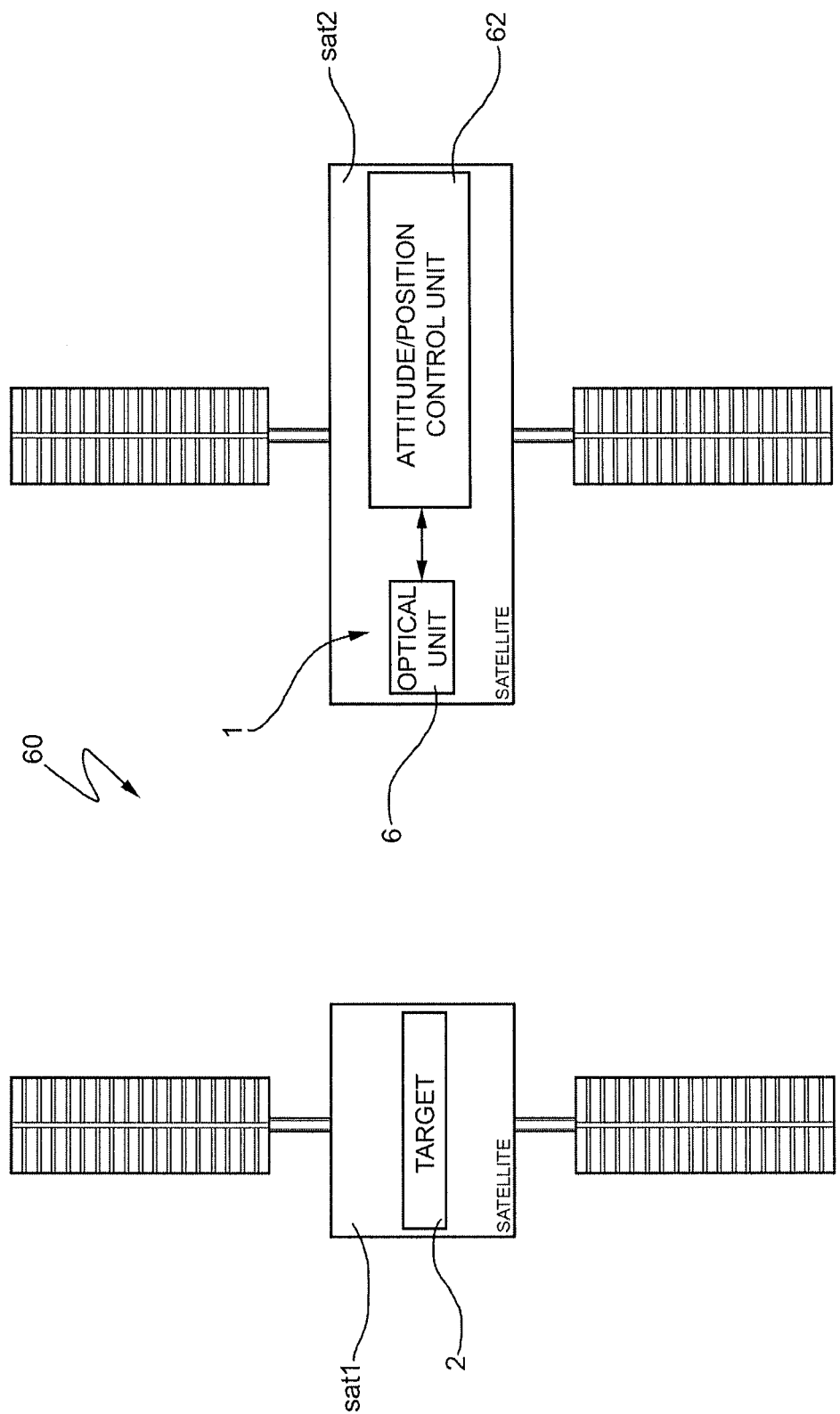

Furthermore, as shown in FIG. 8, the present metrology system can be used within a satellite system 60 including the first and second satellites sat1, sat2, and where the second satellite sat2 houses a system for controlling attitude and position 62, electronically coupled to the electronic processing unit 30. The attitude and position control system 62 thus receives the quantitieth that, in time, are determined by the electronic processing unit 30, iterating the operations described previously. The attitude and position control system 62 can hence operate, in a way in itself known, on the basis of the quantities supplied by the electronic processing unit 30.

The advantages that the present metrology system 1 affords emerge clearly from the foregoing description. In particular, it enables an analytical and non-ambiguous determination of all six degrees of freedom that characterize the position and attitude of the target 2 with respect to the optical unit 6 using a target having a limited number of light sources. Moreover, since both the first optical path and the second optical path start in one and the same point, i.e., in a position corresponding to the diaphragm 12, phenomena of stereoscopic vision are not created.

Finally, it is evident that modifications and variations may be made to the metrology system 1 described herein, without thereby departing from the scope of the present invention.

For example, instead of the diaphragm 12, an input lens may be present. Moreover, the first and second intermediate lenses 22, 24 may be of a type different from what has been described.

The first and second optical beam splitters 14, 16 may be formed by corresponding prisms, or else may be of any known type.

Again, the light sources of the target may be arranged at the vertices of a scalene triangle and/or may be different from what has been described. For example, the light sources may be passive, each comprising a mirror, for example of the so-called "corner cube" type. In this case, the optical unit 6 further comprises an illuminator designed to illuminate the target in such a way that the mirrors that form the light sources reflect radiation towards the optical unit 6 itself.

Finally, as mentioned previously, the metrology system 1 can find uses in sectors other than the aerospace sector. For example, the target 2 can be mounted on a first object, whilst the optical unit 6 can be mounted on a second object, the first and second objects being mechanically coupled in such a way that the metrology system enables determination of the mutual positioning of the first and second objects. For example, said first and second objects can be two different elements of a telescope, mechanically connected together.

What is claimed is:

1. A projective optical metrology system comprising:
    a light target including a plurality of light sources having a pre-set spatial arrangement;
    an optoelectronic image sensor;
    an optical unit configured for receiving a light signal coming from the light target and for defining two different optical paths for the light signal towards the optoelectronic image sensor, the two optical paths being such as to cause simultaneous formation on the optoelectronic image sensor of at least two images of the light target; and
    an electronic processing unit coupled to the optoelectronic image sensor and configured for determining a plurality of different quantities indicating the position and attitude of the light target with respect to the optical unit, on the basis of the two images.

2. The metrology system according to claim 1, wherein the optical unit further comprises a receiving optical element configured for receiving the light signal coming from the light target; and
    wherein both of the two optical paths extend towards the optoelectronic image sensor starting from the receiving optical element.

3. The metrology system according to claim 2, further comprising:
    a first optical circuit having a first front principal plane, a first rear principal plane, and a first rear effective focal length, and defining a first optical path of said two optical paths;
    a second optical circuit having a second front principal plane, a second rear principal plane, and a second rear effective focal length, and defining a second optical path of said two optical paths; and
    wherein the first and second front principal planes are set apart from the receiving optical element, respectively, by a first distance and a second distance different from one another and measured, respectively, along the first and second optical paths; and wherein the first and second rear principal planes are set apart from the optoelectronic image sensor, respectively, by a third distance and a fourth distance, said third and fourth distances being measured, respectively, along the first and second optical paths and being, respectively, a function of the first and second rear effective focal lengths.

4. The metrology system according to claim 3, wherein the third and fourth distances are substantially equal, respectively, to the first and second rear effective focal lengths.

5. The metrology system according to claim 3, wherein the first and second optical circuits are moreover configured so as to generate, starting from the light signal received by the receiving optical element, a first optical beam and a second optical beam, and direct towards the optoelectronic image sensor said first and second optical beams, respectively, along the first and second optical paths, the first and second optical circuits being moreover configured so that the first and second optical beams will impinge upon the optoelectronic image sensor in one and the same direction of incidence.

6. The metrology system according to claim 5, wherein the first optical circuit comprises the receiving optical element and a first optical beam splitter and a second optical beam splitter, the second optical circuit comprising the receiving optical element, the first and second optical beam splitters, and a first reflecting element and a second reflecting element; and
wherein the first optical beam splitter is configured so as to divide the light signal received by the receiving optical element into the first optical beam and second optical beam, the first optical beam splitter being moreover configured for directing the first and second optical beams, respectively, towards the second optical beam splitter and the first reflecting element; and
wherein the first and second reflecting elements are configured for receiving the second optical beam and directing the second optical beam towards the second optical beam splitter, which is configured for directing both the first optical beam and the second optical beam towards the optoelectronic image sensor, in the direction of incidence.

7. The metrology system according to claim 3, wherein the optoelectronic sensor includes a detection surface, and wherein the light target, the detection surface, and the first and second rear effective focal lengths are such that, when the light target is set at a first distance from the optical unit, both of the two images are contained within the detection surface and are such that the electronic processing unit is able to determine, for each of said two images, a number of maxima of light intensity equal to the number of light sources of the light target; and
wherein the electronic processing unit is configured for determining, for each maximum of light intensity determined, a corresponding triad of co-ordinates that identifies the position of the maximum of light intensity in a reference system fixed with respect to the detection surface, each triad of co-ordinates being formed by a corresponding first co-ordinate, second co-ordinate, and third co-ordinate, the electronic processing unit being moreover configured for determining said plurality of different quantities on the basis of the triads of co-ordinates determined.

8. The metrology system according to claim 7, wherein the light target comprises a first light source, a second light source, and a third light source, in such a way that a first image of said two images is formed by a first image dot, a second image dot, and a third image dot, and a second image between said two images is formed by a fourth image dot, a fifth image dot, and a sixth image dot, said first and fourth image dots corresponding to said first light source, said second and fifth image dots corresponding to said second light source, and said third and sixth image dots corresponding to said third light source; and
wherein the electronic processing unit is configured for:
determining a first difference between the first co-ordinate of the first image dot and the first co-ordinate of the second image dot;
determining a second difference between the second co-ordinate of the first image dot and the second co-ordinate of the second image dot;
determining a third difference between the first co-ordinate of the fourth image dot and the first co-ordinate of the fifth image dot;
determining a first angle, as a function of said first and second differences;
determining a spatial quantity indicating the distance of said light target from said optical unit, as a function of the first difference, of the third difference, of said first and second rear effective focal lengths and of said first and second distances; and
determining a second angle as a function of said first and second differences, of said first rear effective focal length, of said first distance and of said spatial quantity, said first and second angles indicating corresponding rototranslations of a reference system fixed respect to said light target with respect to the reference system fixed to the detection surface.

9. The metrology system according to claim 8, wherein said electronic processing unit is moreover configured for:
determining a first displacement as a function of said first difference, of said first rear effective focal length, of said first distance, of said spatial quantity, and of said first and second angles;
determining a second displacement as a function of said second difference, of said first rear effective focal length, of said first distance, of said spatial quantity, and of said first and second angles; and
wherein said first and second displacements indicate rototranslations of said reference system fixed to said light target with respect to the reference system fixed to the detection surface.

10. The metrology system according to claim 9, wherein said electronic processing unit is moreover configured for:
determining a third angle as a function of the first and second co-ordinates of the third image dot, of said first rear effective focal length, of said first distance, of said spatial quantity, of said first and second displacements, and of said first and second angles, said third angle indicating a corresponding rototranslation of the reference system fixed to the detection surface with respect to said reference system fixed to said light target.

11. A satellite system comprising a first satellite and a second satellite, and a metrology system according to claim 1, wherein the light target and the optical unit are constrained, respectively, to the first satellite and to the second satellite; and
further comprising an attitude and position control system constrained to the second satellite and configured for receiving said plurality of different quantities from the electronic processing unit.

12. A projective optical metrology system comprising:
a light target including a plurality of light sources having a pre-set spatial arrangement;
an optoelectronic image sensor;

an optical unit configured for receiving a light signal coming from the light target and for defining two different optical paths for the light signal towards the optoelectronic image sensor, the two optical paths being such as to cause simultaneous formation on the optoelectronic image sensor of at least two images of the light target, the optical unit further including a receiving optical element configured for receiving the light signal coming from the light target, wherein both of the two optical paths extend towards the optoelectronic image sensor starting from the receiving optical element;

an electronic processing unit coupled to the optoelectronic image sensor and configured for determining a plurality of different quantities indicating the position and attitude of the light target with respect to the optical unit, on the basis of the two images;

a first optical circuit having a first front principal plane, a first rear principal plane, and a first rear effective focal length, and defining a first optical path of said two optical paths; and a second optical circuit having a second front principal plane, a second rear principal plane, and a second rear effective focal length, and defining a second optical path of said two optical paths; and wherein the first and second front principal planes are set apart from the receiving optical element, respectively, by a first distance and a second distance different from one another and measured, respectively, along the first and second optical paths;

wherein the first and second rear principal planes are set apart from the optoelectronic image sensor, respectively, by a third distance and a fourth distance, said third and fourth distances being measured, respectively, along the first and second optical paths and being, respectively, a function of the first and second rear effective focal lengths; and wherein the optoelectronic sensor includes a detection surface, and wherein the light target, the detection surface, and the first and second rear effective focal lengths are such that, when the light target is set at a first distance from the optical unit, both of the two images are contained within the detection surface and are such that the electronic processing unit is able to determine, for each of said two images, a number of maxima of light intensity equal to the number of light sources of the light target.

13. The metrology system according to claim 12, wherein the third and fourth distances are substantially equal, respectively, to the first and second rear effective focal lengths.

14. The metrology system according to claim 12, wherein the first and second optical circuits are moreover configured so as to generate, starting from the light signal received by the receiving optical element, a first optical beam and a second optical beam, and direct towards the optoelectronic image sensor said first and second optical beams, respectively, along the first and second optical paths, the first and second optical circuits being moreover configured so that the first and second optical beams will impinge upon the optoelectronic image sensor in one and the same direction of incidence.

15. The metrology system according to claim 14, wherein the first optical circuit comprises the receiving optical element and a first optical beam splitter and a second optical beam splitter, the second optical circuit comprising the receiving optical element, the first and second optical beam splitters, and a first reflecting element and a second reflecting element; and wherein the first optical beam splitter is configured so as to divide the light signal received by the receiving optical element into the first optical beam and second optical beam, the first optical beam splitter being moreover configured for directing the first and second optical beams, respectively, towards the second optical beam splitter and the first reflecting element; and wherein the first and second reflecting elements are configured for receiving the second optical beam and directing the second optical beam towards the second optical beam splitter, which is configured for directing both the first optical beam and the second optical beam towards the optoelectronic image sensor, in the direction of incidence.

16. The metrology system according to claim 12, wherein the electronic processing unit is configured for determining, for each maximum of light intensity determined, a corresponding triad of co-ordinates that identifies the position of the maximum of light intensity in a reference system fixed with respect to the detection surface, each triad of co-ordinates being formed by a corresponding first co-ordinate, second co-ordinate, and third co-ordinate, the electronic processing unit being moreover configured for determining said plurality of different quantities on the basis of the triads of co-ordinates determined.

17. The metrology system according to claim 16, wherein the light target comprises a first light source, a second light source, and a third light source, in such a way that a first image of said two images is formed by a first image dot, a second image dot, and a third image dot, and a second image between said two images is formed by a fourth image dot, a fifth image dot, and a sixth image dot, said first and fourth image dots corresponding to said first light source, said second and fifth image dots corresponding to said second light source, and said third and sixth image dots corresponding to said third light source; and wherein the electronic processing unit is configured for:
determining a first difference between the first co-ordinate of the first image dot and the first co-ordinate of the second image dot;
determining a second difference between the second co-ordinate of the first image dot and the second co-ordinate of the second image dot;
determining a third difference between the first co-ordinate of the fourth image dot and the first co-ordinate of the fifth image dot;
determining a first angle, as a function of said first and second differences;
determining a spatial quantity indicating the distance of said light target from said optical unit, as a function of the first difference, of the third difference, of said first and second rear effective focal lengths and of said first and second distances; and
determining a second angle as a function of said first and second differences, of said first rear effective focal length, of said first distance and of said spatial quantity, said first and second angles indicating corresponding rototranslations of a reference system fixed respect to said light target with respect to the reference system fixed to the detection surface.

18. The metrology system according to claim 17, wherein said electronic processing unit is moreover configured for:
determining a first displacement as a function of said first difference, of said first rear effective focal length, of said first distance, of said spatial quantity, and of said first and second angles;

determining a second displacement as a function of said second difference, of said first rear effective focal length, of said first distance, of said spatial quantity, and of said first and second angles; and wherein said first and second displacements indicate rototranslations of said reference system fixed to said light target with respect to the reference system fixed to the detection surface.

19. The metrology system according to claim 18, wherein said electronic processing unit is moreover configured for:

determining a third angle as a function of the first and second co-ordinates of the third image dot, of said first rear effective focal length, of said first distance, of said spatial quantity, of said first and second displacements, and of said first and second angles, said third angle indicating a corresponding rototranslation of the reference system fixed to the detection surface with respect to said reference system fixed to said light target.

20. A satellite system comprising a first satellite and a second satellite, and a metrology system according to claim 12, wherein the light target and the optical unit are constrained, respectively, to the first satellite and to the second satellite; and further comprising an attitude and position control system constrained to the second satellite and configured for receiving said plurality of different quantities from the electronic processing unit.

* * * * *

UNITED STATES PATENT AND TRADEMARK OFFICE
CERTIFICATE OF CORRECTION

PATENT NO. : 8,625,108 B2  
APPLICATION NO. : 13/440734  
DATED : January 7, 2014  
INVENTOR(S) : Fulvio Bresciani and Fabio Musso It is certified that error appears in the above-identified patent and that said Letters Patent is hereby corrected as shown below:

On the Title Page, Item (54) and in the Specification, Column 1, Line 1, Title:

remove: PROTECTIVE insert: --PROJECTIVE--

On the Title Page, Item (75) Inventors:

remove: Fulvio Bresciani, Rome (IT); Fabio Musso, Rome (IT)

insert: --Fulvio Bresciani, Turino (IT); Fabio Musso, Turino (IT)--

Signed and Sealed this  
Fifteenth Day of July, 2014

Michelle K. Lee  
*Deputy Director of the United States Patent and Trademark Office*

UNITED STATES PATENT AND TRADEMARK OFFICE
CERTIFICATE OF CORRECTION

PATENT NO. : 8,625,108 B2
APPLICATION NO. : 13/440734
DATED : January 7, 2014
INVENTOR(S) : Fulvio Bresciani and Fabio Musso Page 1 of 1

It is certified that error appears in the above-identified patent and that said Letters Patent is hereby corrected as shown below:

On the Title Page, Item (54) and in the Specification, Column 1, Line 1, Title:

remove: PROTECTIVE insert: --PROJECTIVE--

On the Title Page, Item (75) Inventors:

remove: Fulvio Bresciani, Turino (IT); Fabio Musso, Turino (IT)

insert: --Fulvio Bresciani, Torino (IT); Fabio Musso, Torino (IT)--

This certificate supersedes the Certificate of Correction issued July 15, 2014.

Signed and Sealed this
Eleventh Day of November, 2014

Michelle K. Lee
*Deputy Director of the United States Patent and Trademark Office*